(12) United States Patent
Chi

(10) Patent No.: US 6,676,782 B2
(45) Date of Patent: Jan. 13, 2004

(54) METHOD FOR MAKING A SHOE HAVING A FOAMED MIDSOLE ENCLOSED IN THE SHOE

(76) Inventor: Cheng-Hsian Chi, No. 15, Lane 22, Tung-Hsing-Tung St., Nan-Tun Dist., Taichung City (TW)

( * ) Notice: Subject to any disclaimer, the term of this patent is extended or adjusted under 35 U.S.C. 154(b) by 268 days.

(21) Appl. No.: 09/861,951

(22) Filed: May 21, 2001

(65) Prior Publication Data

US 2002/0170650 A1 Nov. 21, 2002

(51) Int. Cl.[7] .............................................. B29D 31/518
(52) U.S. Cl. ...................... 156/79; 156/245; 264/244; 264/325; 36/30 R
(58) Field of Search ........................... 156/78, 79, 209, 156/242, 245; 264/244, 321, 325, 261, 263; 36/30 R, 44

(56) References Cited

U.S. PATENT DOCUMENTS

| | | | | |
|---|---|---|---|---|
| 3,463,849 A | * | 8/1969 | Winkler | 264/244 |
| 4,120,477 A | * | 10/1978 | Justamante | 249/109 |
| RE35,905 E | * | 9/1998 | Vincent et al. | 12/142 P |
| 5,843,352 A | * | 12/1998 | Chi | 264/45.1 |
| 6,149,852 A | * | 11/2000 | Romanato et al. | 264/263 |
| 6,205,683 B1 | * | 3/2001 | Clark et al. | 36/30 R |

* cited by examiner

Primary Examiner—Michael W. Ball
Assistant Examiner—Todd J Kilkenny
(74) Attorney, Agent, or Firm—Ladas & Parry (57) ABSTRACT

A method for making a shoe includes the steps of preparing an outsole, an upper having an insole, a cover strip, and a mold, placing the outsole, the upper, and the cover strip in the mold cavity such that the outsole and the insole are interconnected by the cover strip to confine an inner space thereamong, closing the mold, filling a foamable material into the inner space, and permitting the foamable material to expand to form a foamed midsole that is enclosed by and that is bonded to the outsole, the insole, and the cover strip.

12 Claims, 9 Drawing Sheets

METHOD FOR MAKING A SHOE HAVING A FOAMED MIDSOLE ENCLOSED IN THE SHOE

BACKGROUND OF THE INVENTION

1. Field of the Invention

This invention relates to a method for making a shoe having a foamed midsole, more particularly to a method for making a shoe having an outsole, an insole, and a foamed midsole bonded to and enclosed by the outsole and the insole.

2. Description of the Related Art

Figure 1:
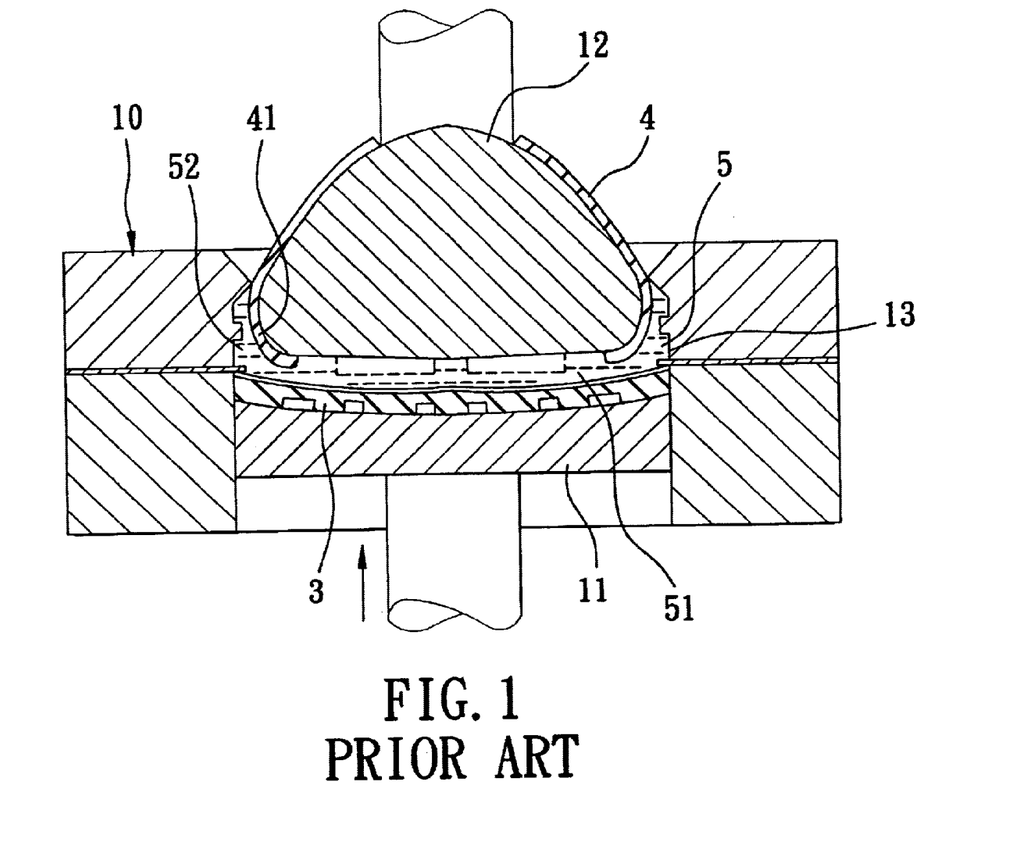
FIG. 1 is a cross-sectional side view to illustrate a conventional method for making a shoe.

FIG. 1 illustrates a conventional method for making a shoe including an upper 4, an outsole 3, and an midsole 5 interconnecting the upper 4 and the outsole 3. The midsole 5 has a base portion 51 in contact with and bonded to the outsole 3, and an upper flange portion 52 extending upwardly from the base portion 51 and bonded to a bottom portion 41 of the upper 4. The method employs a mold 10 including an upper with a last 12, a bottom mold part 11, and side mold parts, which defines a mold cavity 13. The midsole 5 is formed by filling a foamable material, such as polyurethane, into a portion of the mold cavity 13 that is defined by the outsole 3 which is laid on an inner wall of the bottom mold part 11, a bottom portion of the last 12, the bottom portion 41 of the upper 4 which is sleeved on the bottom portion of the last 12, and inner walls of the side mold parts and permitting the foamable material to expand so as to form a foamed body of the midsole 5 in the mold cavity 13.

The midsole 5 normally includes filler in form of pellets which are disposed on the outsole 3 (not shown) in the mold cavity 13 before the closing of the mold parts and which are enclosed by the foamed body during the formation of the same.

The method for making the shoe is disadvantageous in that the pellets of the filler tend to be moved around in the portion of the mold cavity 13 upon filling of the foamable material. As a consequence, some of the pellets may protrude outwardly from an outer surface of the upper flange portion 52 of the midsole 5, thereby adversely affecting the appearance of the shoe. Moreover, since the upper flange portion 52 of the midsole 5 is exposed in the environment, it tends to deteriorate and discolor.

SUMMARY OF THE INVENTION

Therefore, the object of the present invention is to provide a method for making a shoe that is capable of overcoming the aforementioned drawbacks.

According to the present invention, a method for making a shoe comprises the steps of: preparing an outsole having an upper surface and a peripheral portion; preparing an upper having a bottom portion that defines an insole having a peripheral portion which is to be disposed over the peripheral portion of the outsole; preparing a cover strip that is to be disposed between and that is to interconnect the outsole and the insole; preparing a mold that has an inner wall defining a mold cavity, an upper mold part with a last, a bottom mold part opposite to the upper mold part, and at least two opposite side mold parts; placing the outsole, the upper, and the cover strip in the mold cavity such that the outsole is mounted on the bottom mold part, that the upper is fittingly sleeved on the last with the insole being disposed over the outsole, and that the peripheral portions of the insole and the outsole are interconnected by the cover strip so as to confine an inner space thereamong; closing the mold; filling a foamable material into the inner space; and permitting the foamable material in the inner space to expand to thereby forcing the outsole, the insole, and the cover strip to press against the inner wall of the mold so as to form a foamed midsole that is enclosed by and that is bonded to the outsole, the insole, and the cover strip.

BRIEF DESCRIPTION OF THE DRAWINGS

In the drawings which illustrate an embodiment of the invention.

DETAILED DESCRIPTION OF THE PREFERRED EMBODIMENT

Figure 2:
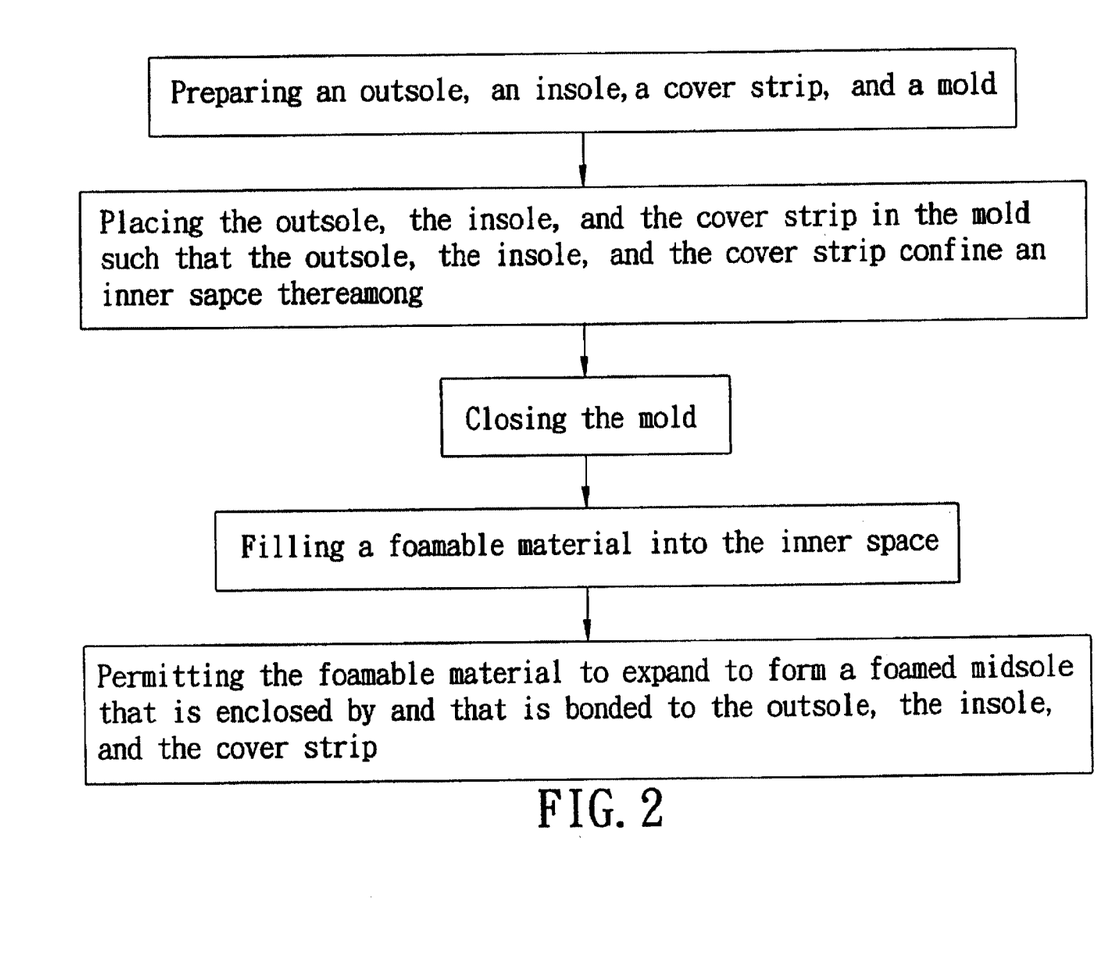
FIG. 2 is a block diagram to show consecutive steps of a method embodying this invention for making a shoe.
Figure 3:
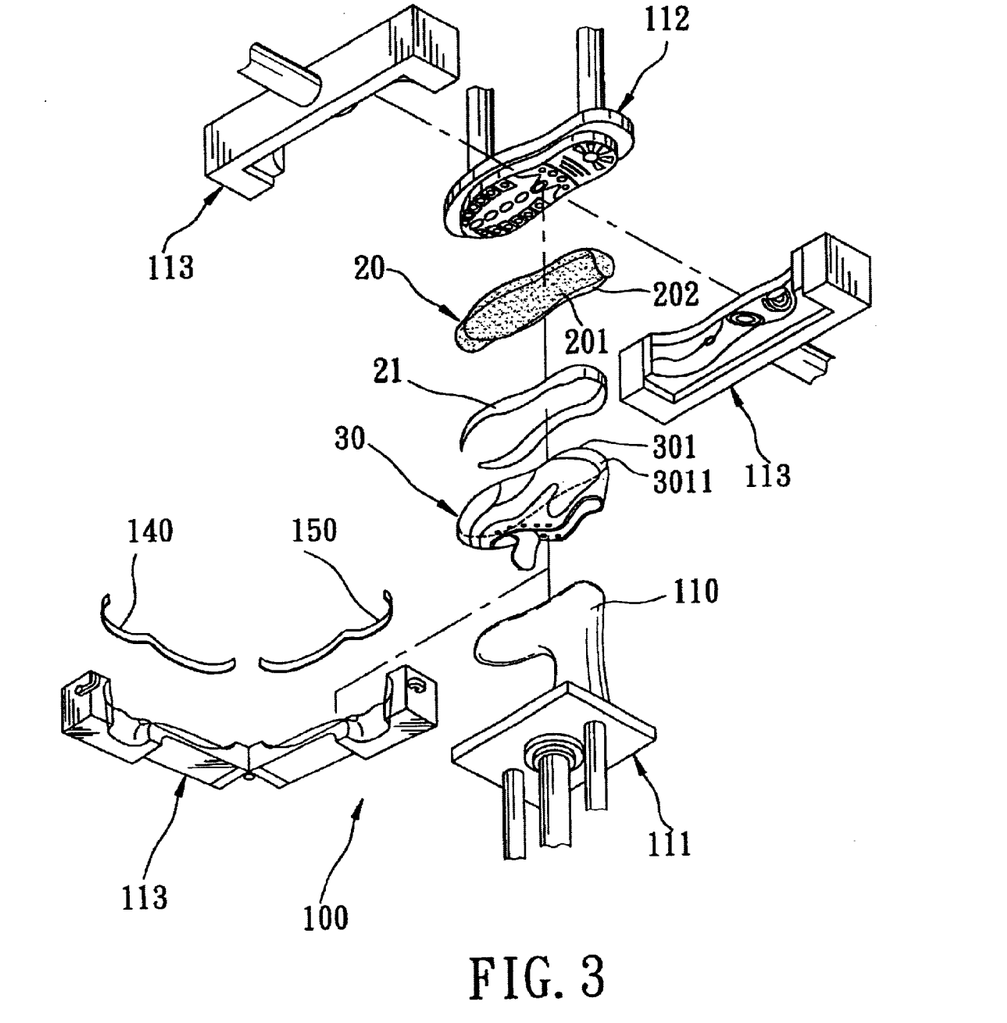
FIGS. 3 and 4 illustrate how a foamed midsole of the shoe is formed in a mold according to the method of this invention.
Figure 4:
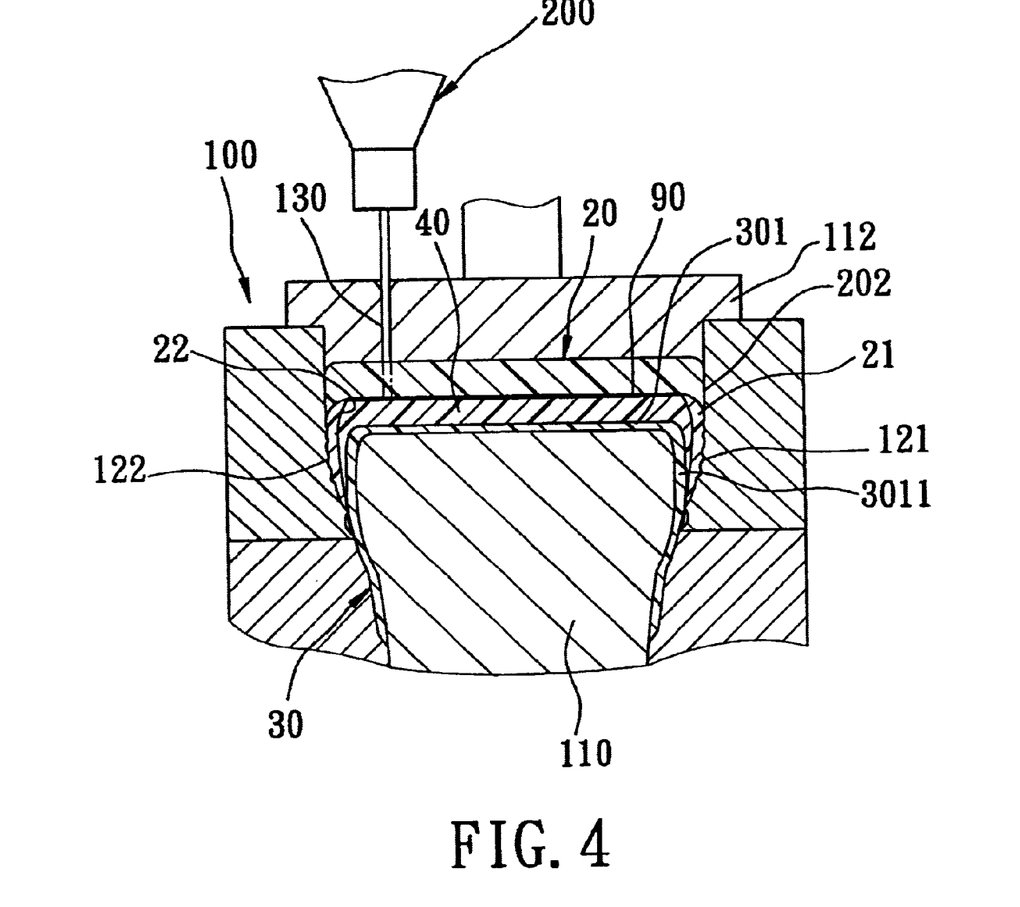
Figure 5:
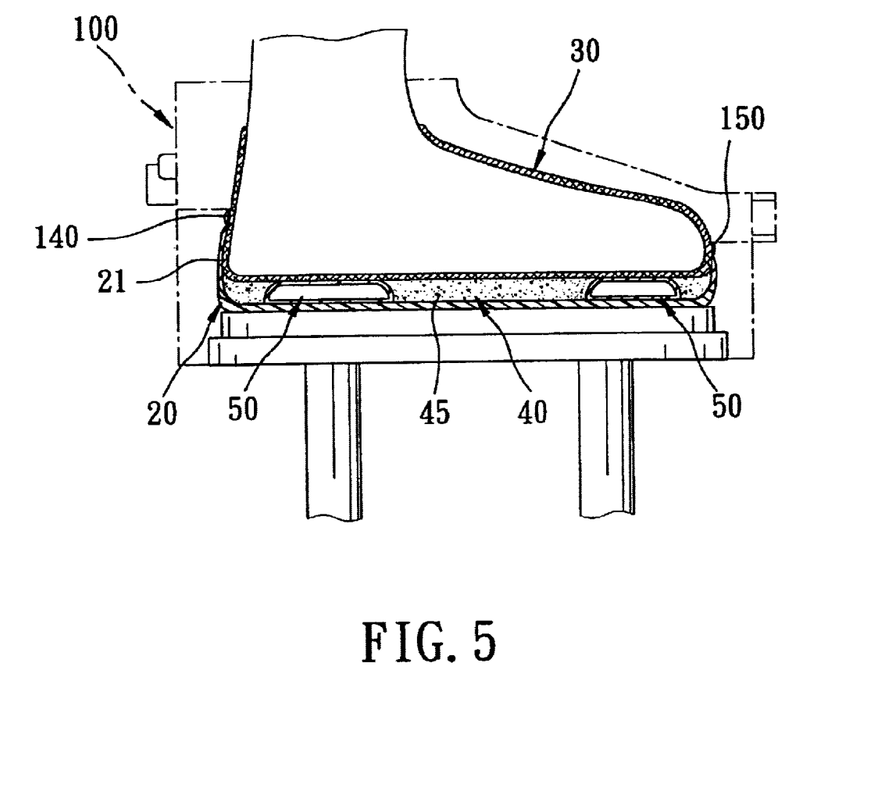
FIG. 5 is a fragmentary cross-sectional side view to illustrate cushioning pads which can be optionally embedded in the foamed midsole of FIG. 4 according to the method of this invention.

FIG. 2 shows consecutive steps of a method embodying this invention for making a shoe. FIGS. 3 to 5, illustrate how a foamed midsole 40 of the shoe is formed according to the method of this invention. The method includes the steps of: preparing an outsole 20 having an upper surface 201 and a peripheral portion 202; applying an adhesive onto the upper surface 201 of the outsole 20; preparing an upper 30 having a bottom portion that defines an insole 301 having a peripheral portion 3011 which is to be disposed over the peripheral portion 202 of the outsole 20; preparing a cover strip 21 that is to be disposed between and that is to interconnect the outsole 20 and the insole 301; preparing a mold 100 that has an inner wall 121 defining a mold cavity 122, an upper mold part 111 with a last 110, a bottom mold part 112 opposite to the upper mold part 111, and at least two opposite side mold parts 113; heating the mold 100 to a molding temperature; placing the outsole 20, the upper 30, and the cover strip 21 in the mold cavity 122 such that the outsole 20 is mounted on the bottom mold part 112, that the upper 30 is fittingly sleeved on the last 110 with the insole 301 being disposed over the outsole 20, and that the peripheral portions 3011, 202 of the insole 301 and the outsole 20 are interconnected by the cover strip 21 so as to confine an inner space 22 thereamong; closing the mold 100; filling a gas into the inner space 22 so as to force the outsole 20, the insole 301, and the cover strip 21 to press against the inner wall 121 of the mold 100; filling a foamable material into the inner space 22 by injecting the foamable material from a feeding device 200 through a channel 130 that extends through the bottom mold part 112 and the outsole 20 and into the inner space 22 and permitting the air in the inner space 22 to simultaneously evacuate through vent-holes (not shown) that extends through the bottom mold part 112 and the outsole 20; and permitting the foamable material in the inner space 22 to expand to thereby forcing the outsole 20, the insole 301, and the cover strip 21 to press against the inner wall 121 of the mold 100 so as to form a foamed midsole 40 that is enclosed by and that is bonded to the outsole 20, the insole 301, and the cover strip 21.

Preferably, the peripheral portions 202, 3011 of the outsole 20 and the insole 301 are adhesively bonded to the cover strip 21 so as to be interconnected by the same before placing in the mold cavity 122, and more preferably, the peripheral portion 202 of the outsole 20 is adhesively bonded to the cover strip 21 and the peripheral portion 3011 of the insole 301 is stitched on the cover strip 21.

The cover strip 21 can be made of ethylene vinylacetate copolymer, rubber, resilient cloth, leather, and the like. Preferably, the cover strip 21 is made of ethylene vinylacetate copolymer. The foamable material employed in the method of this invention is preferably made of polyurethane.

The molding temperature for forming the foamed midsole 40 of polyurethane is in a range of about 50 to 120° C. The inner wall 121 of the mold 100 can be patterned so that when the cover strip 21 is pressed against and is heated by the mold 100 upon foaming of the foamable material in the mold 100, the same can be patterned.

It is noted that instead of preparing the cover strip 21 and the outsole 20 as separate parts the cover former can be integrally formed on the peripheral portion 202 of the outsole 20.

The method of this invention can further include a step of loading a filler 45 in the inner space 22 before the placement of the assembly of the outsole 20, the insole 301, and the cover strip 21 in the mold cavity 122 so that the filler 45 will be embedded in the foamed midsole 40 after formation of the foamed midsole 40. The filler 45 can be in the form of pellets, and can be made of a plastic material selected from a group consisting of ethylene vinylacetate copolymer, rubber, and polyurethane.

Figure 6:
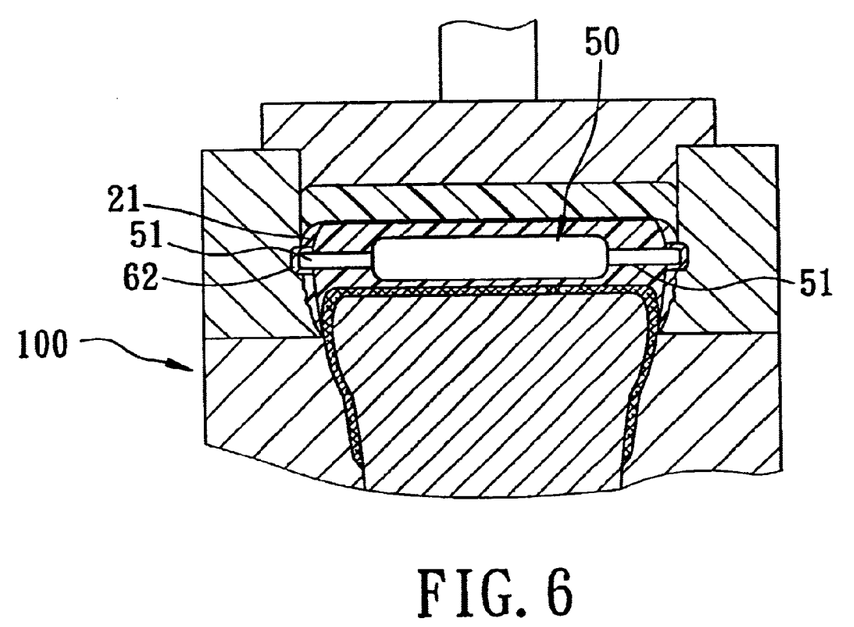
FIG. 6 is a fragmentary cross-sectional side view to illustrate the cushioning pads of FIG. 5 in the form of air units that can be exposed from the shoe.

Referring now to FIG. 6, in combination with FIG. 5, the method of this invention can further include a step of disposing a plurality of cushioning pads 50, such as air units, in the inner space 22 before the placement of the assembly of the outsole 20, the insole 301, and the cover strip 21 in the mold cavity 122 so that the cushioning pads can be embedded in the foamed midsole 40 after formation of the foamed midsole 40. Each cushioning pad 50 can have extensions 51 extending through the cover strip 21 so as to be exposed from the cover strip 21. As such, the inner wall 121 of the mold 100 is provided with positioning holes 103 for receiving the extensions 51 during the formation of the foamed midsole 40. Preferably, the extensions 51 are sleeved with sleeves 62 which are received in the positioning holes 103 during the formation of the foamed midsole 40.

Figure 7:
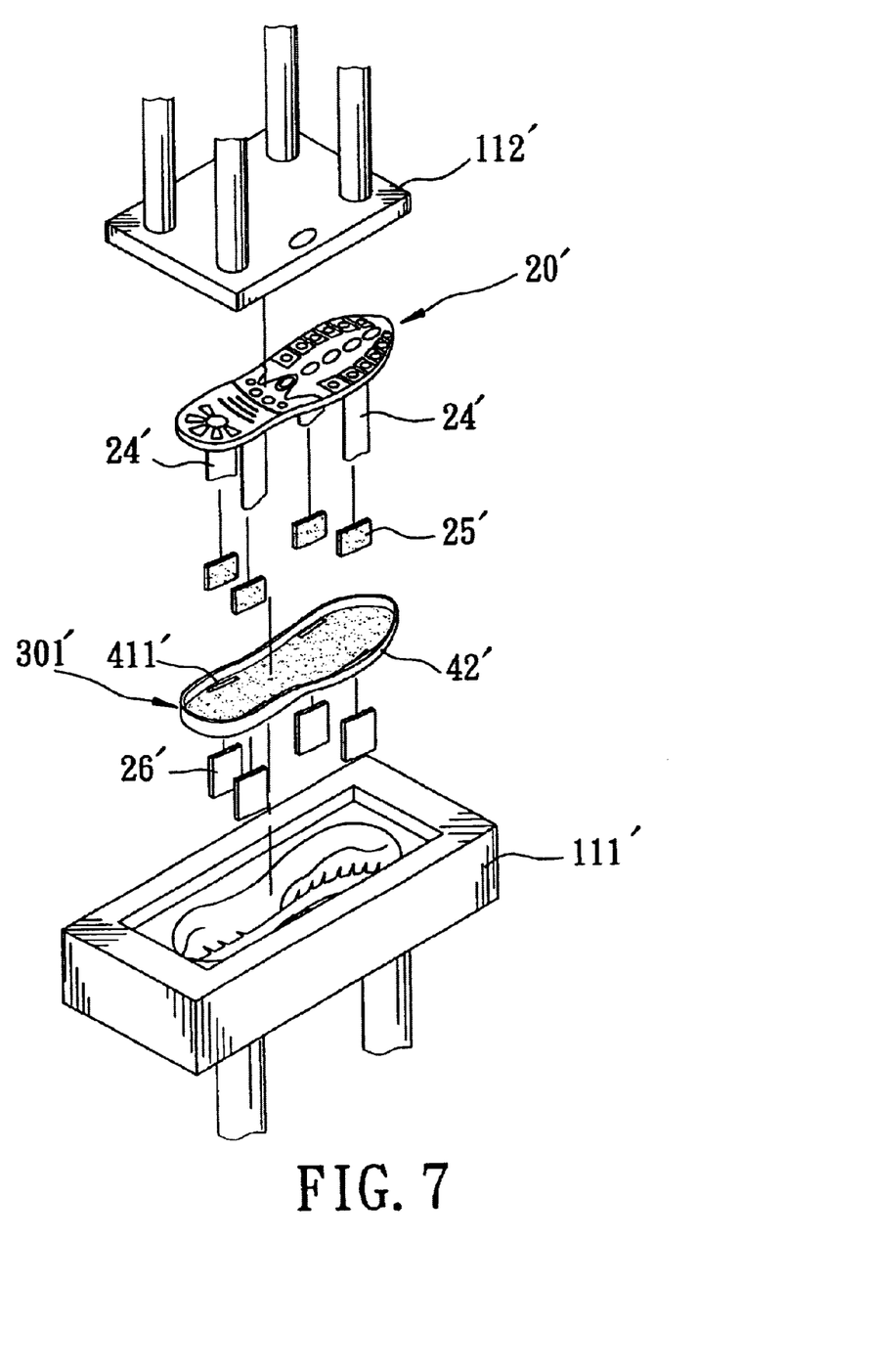
FIGS. 7 to 9 illustrate how a sandal is made according to the method of this invention.
Figure 8:
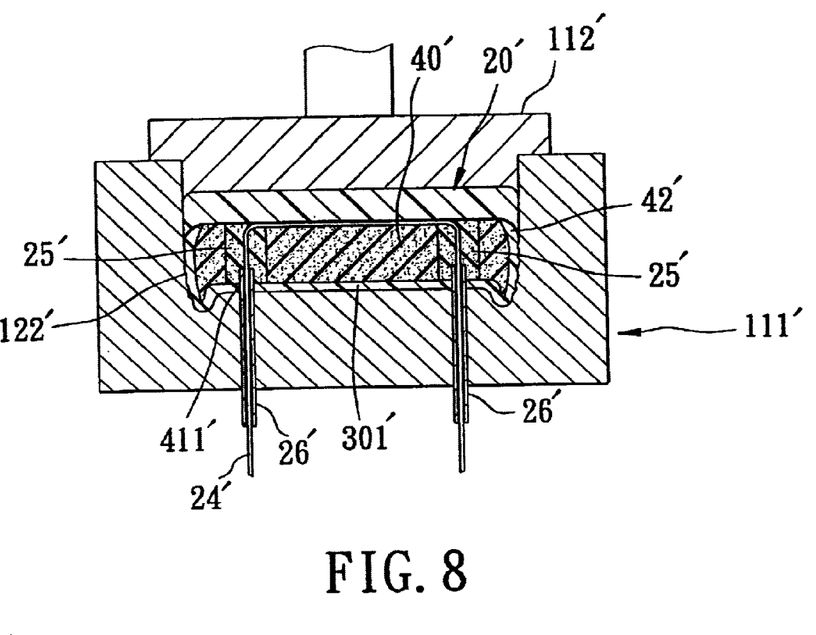
Figure 9:
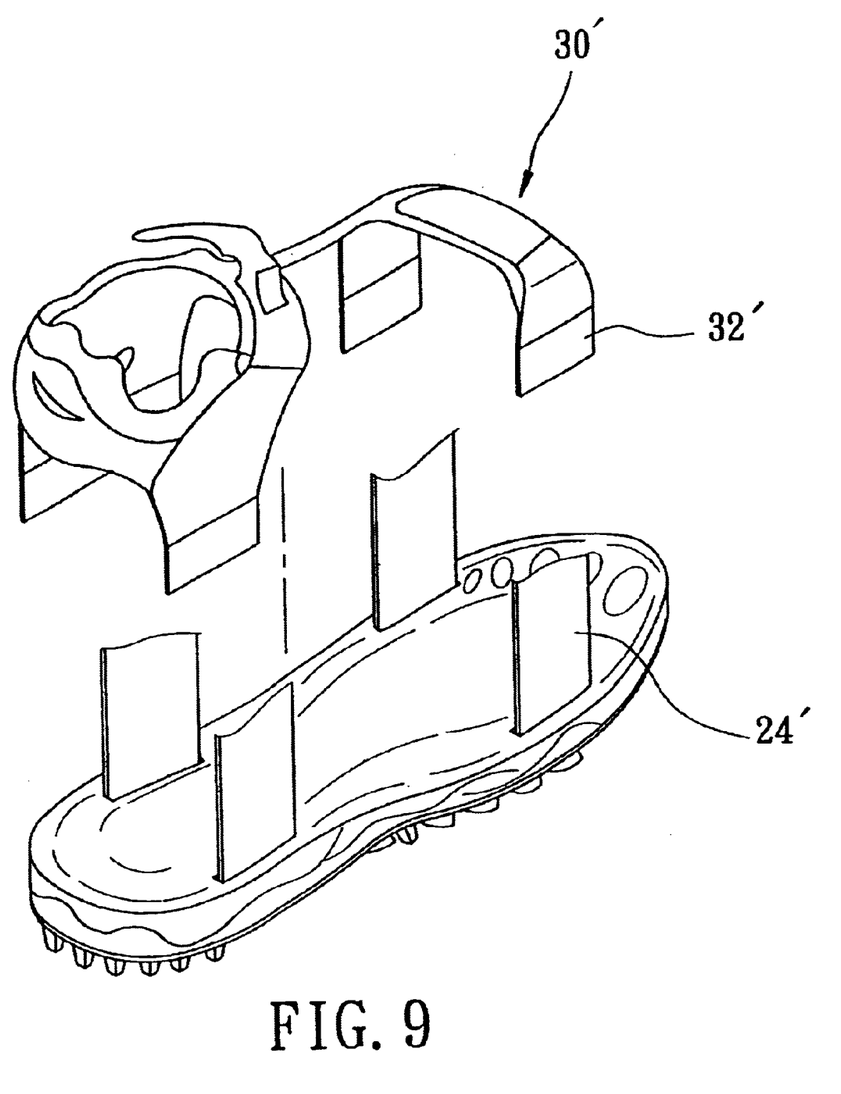

FIGS. 7 to 9 illustrate how a sandal is made according to the method of this invention. The sandal includes an outsole 20', an insole 301' with an upper flange 42' disposed over and connected to the outsole 20', a foamed midsole 40' formed according to the method of this invention and enclosed by the outsole 20' and the insole 301', and a strap unit 30' having four end portions 32'.

The outsole 20' is provided with a pair of linking straps 24' having end portions which are stitched onto the end portions 32' of the strap unit 30'. The insole 301' is formed with four slits 411' for passage of the end portions of the linking straps 24'. Before the formation of the foamed midsole 40', the insole 301' and the outsole 20' are respectively mounted on the upper mold part 111' and the bottom mold part 112', and four positioning sleeves 26' and four support sleeves 25' are provided and are disposed in a manner that the four positioning sleeves 26' extends through the upper mold part 111' and respectively into the slits 411', that the four support sleeves 25' is disposed between the outsole 20' and the insole 301' at the slits 411' and respectively receive the end portions of the linking straps 24', and that the end portions of the linking straps 24' extends outwardly of the upper mold part 111' through the positioning sleeves 26'. After the formation of the foamed midsole 40', the positioning sleeves 26' can be removed from the upper mold part 111', and the end portions of the linking straps 24' can be stitched onto the end portions 32' of the strap unit 30' after the removal of the upper and bottom mold parts 111', 112'. It is noted that the end portions 32' of the strap unit 30' can be stitched onto the end portions of the linking straps 24' and the thus formed assembly is then disposed in the mold cavity 122' for subsequent processing steps for the formation of the foamed midsole 40'.

Since the foamed midsole 40' is enclosed by the outsole 20(20'), the insole 301(301'), and/or the cover strip 21, the drawbacks as encountered in the prior art can be eliminated.

With the invention thus explained, it is apparent that various modifications and variations can be made without departing from the spirit of the present invention. It is therefore intended that the invention be limited only as recited in the appended claims.

I claim:

1. A method for making a shoe, comprising the steps of:
   preparing an outsole having an upper surface and a peripheral portion;
   preparing an upper having a bottom portion that defines an insole having a peripheral portion which is to be disposed over said peripheral portion of said outsole;
   preparing a cover strip that is to be disposed between and that is to interconnect said outsole and said insole;
   preparing a mold that has an inner wall defining a mold cavity, an upper mold part with a last, a bottom mold part opposite to said upper mold part, and at least two opposite side mold parts;
   placing said outsole, said upper, and said cover strip in said mold cavity such that said outsole is mounted on said bottom mold part, that said upper is fittingly sleeved on said last with said insole being disposed over said outsole, and that said peripheral portions of said insole and said outsole are interconnected by said cover strip so as to confine an inner space thereamong;
   closing said mold;
   filling a foamable material into said inner space; and
   permitting said foamable material in said inner space to expand to thereby forcing said outsole, said insole, and said cover strip to press against said inner wall of said mold so as to form a foamed midsole that is enclosed by and that is bonded to said outsole, said insole, and said cover strip.

2. The method of claim 1, wherein said outsole and said insole are interconnected by said cover strip before placing in said mold cavity.

3. The method of claim 2, wherein said outsole and said insole are adhesively bonded to said cover strip so as to be interconnected by the same before placing in said mold cavity.

4. The method of claim 3, further comprising the step of heating said mold to a molding temperature before the placement of the assembly of said outsole, said insole, and said cover strip in said mold cavity.

5. The method of claim 4, further comprising the step of filling a gas into said inner space so as to force said outsole, said insole, and said cover strip to press against said inner wall of said mold before the step of filling said foamable material into said inner space.

6. The method of claim 5, wherein said inner wall of said mold is patterned, said cover strip being pressed against and being heated by said mold upon foaming of said foamable material in said mold so as to be patterned by said mold.

7. The method of claim 6, wherein said cover strip is made of ethylene vinylacetate copolymer, and said foamable material is made of polyurethane.

8. The method of claim 2, further comprising the step of loading a filler in said inner space before the placement of the assembly of said outsole, said insole, and said cover strip in said mold cavity, said filler being in the form of pellets, and being made of a plastic material selected from a group consisting of ethylene vinylacetate copolymer, rubber, and polyurethane.

9. The method of claim 2, further comprising the step of disposing a plurality of cushioning pads in said inner space before the placement of the assembly of said outsole, said insole, and said cover strip in said mold cavity.

10. The method of claim 9, wherein each of said cushioning pads is an air unit.

11. The method of claim 1, further comprising the step of attaching a pair of flexible strips to said peripheral portion of said upper, said flexible strips having lower end edges surrounding said peripheral portion of said upper, said cover strip having upper edges in abutment with said end edges of said flexible strips.

12. The method of claim 1, further comprising the step of applying an adhesive to said upper surface of said outsole before placement of said outsole in said mold.

* * * * *